United States Patent Office 2,756,221
Patented July 24, 1956

2,756,221

LINEAR POLYAMIDES AND METHODS OF MAKING SAME

John R. Caldwell, Kingsport, Tenn., assignor to Eastman Kodak Company, Rochester, N. Y., a corporation of New Jersey No Drawing. Application October 7, 1953, Serial No. 384,797

6 Claims. (Cl. 260—78)

This invention relates to the manufacture of new linear polyamides and is particularly concerned with the preparation of high molecular weight linear polyamides derived from aromatic dicarboxylic acids.

Linear polyamides have been prepared by coreacting a diamine, a dibasic acid, and a glycol to form high molecular weight polymers which have been used in the manufacture of synthetic fibers, oriented films, foils, coating compositions, and molded articles. Attempts have been made to prepare polyamides from aliphatic dibasic acids and diamines, but such polyamides crystallize during processing and become opaque. Generally speaking, the manufacture of polyamides from aromatic dibasic acids and aliphatic diamines has not been particularly successful because the products have melting points above their decomposition temperatures. Thus, for example, the polyamide from terephthalic acid and hexamethylene diamine decomposes at about 300° C. without melting. As a consequence, such polyamides are completely unsuitable for molding, extrusion processes, melt spinning, and the like.

It is accordingly an object of this invention to provide a new class of linear polyamides of high molecular weight which remain transparent during processing.

It is another object of the invention to provide improved linear polyamides suitable for the manufacture of films, fibers, and molded objects.

Another object of the invention is to provide a new and improved method for preparing linear polyamides having improved clarity from aromatic dicarboxylic acids.

Another object of the invention is to provide linear polyamides from aromatic dicarboxylic acids which are suitable for use in injection molding and extrusion processes.

Another object of the invention is to provide linear polyamides derived from branched chain 4,4'-substituted dibenzoic acids.

Another object of the invention is to provide linear polyamides of a type not known heretofore and which can be used in the manufacture of strong, elastic, textile fibers.

Another object of the invention is to provide new polyamide products which soften over a relatively wide temperature range.

Another object of the invention is to prepare new polyamides which do not crystallize to an objectionable degree when they are extruded, rolled, or drafted and which are of particular value in the preparation of transparent films, sheets, rods and tubes and supporting layers for photographic film.

Another object of the invention is to prepare improved linear polyamides which are suitable for making clear transparent molded objects such as lenses, prisms, and other optical devices.

Other objects will be apparent from the description and claims which follow.

These and other objects are attained by means of this invention which comprises heating at reaction temperature a diamine containing at least one hydrogen atom on each amino nitrogen atom and a 4,4'-substituted dibenzoic acid of the formula:

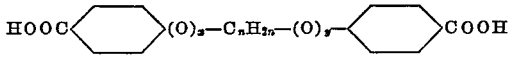

wherein $x$ and $y$ are either 0 or 1, $n$ is a number from 2 to 6 and including 2 and 6 and the $C_2H_{2n}$ group has a branched chain. The polymers prepared from these dibenzoic compounds and the diamine melt without decomposing and do not crystallize to an objectionable degree during processing.

The polyamides embodying this invention can be prepared in the usual manner by heating the dibenzoic acid derivatives and the diamine at reaction temperature for several hours. The reaction can be effected in aqueous media or in a suitable solvent such as cresol, xylenol, or the like. The reaction temperature is desirably in excess of 150° C. and preferably in the range of 210 to 280° C. although higher temperatures, as for example 300° C. or higher, can be used in some cases. Although it is not necessary, it is usually desirable to form the salt of the amine and the acid before heating them to reaction temperatures. Optimum results are obtained by purifying such salt by recrystallization from an alcohol-water mixture.

The invention will be described with particular reference to the preparation of polyamides from the diamine and the dibasic acid derivatives as defined herein, but it will be understood that other dibasic acids such as adipic, pimelic, sebacic, isophthalic, terephthalic acid, and the like may be used in combination with the 4,4'-substituted dibasic acid to give mixed polyamides.

In practicing this invention, any of the dibenzoic acid derivatives of the formula:

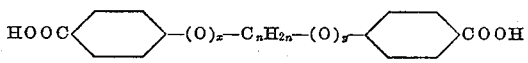

can be employed. The substituent group in the 4,4'-position can be an alkylene group, an alkylidene group, an alkylenoxy group including an alkylene dioxy group, or an alkylidenoxy group including alkylidene dioxy groups. The substituent group in the compounds used in practicing this invention has a branched chain and contains at least 2 and not more than 6 carbon atoms. Suitable examples of substituent groups are as follows:

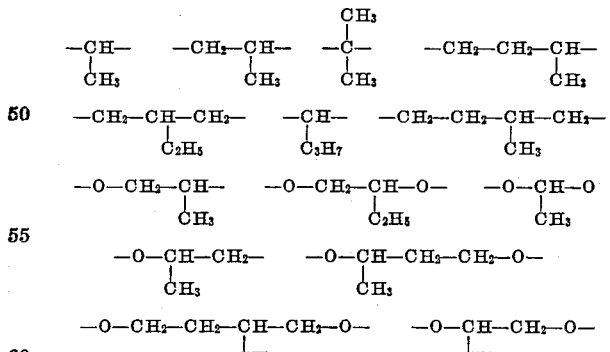

Any of the 4,4'-substituted dibenzoic acids containing these or other substituent groups corresponding to the general formula described hereinabove are suitable for use in preparing the improved transparent polyamides which embody this invention.

In practicing this invention, the free dibasic acid is desirably employed, but the polymers can be prepared either from the acid or from some suitable amide forming or ester forming derivative of the acids, such as the esters, half-esters, anhydrides, amide, or chlorides. The term "dibenzoic acid" as used herein and in the claims is intended to include such derivatives of the acids.

These and similar 4,4'-substituted dibenzoic acids as defined are heated with a diamine which contains at least one hydrogen atom on each amino nitrogen atom. The diamines which are preferably employed are the aliphatic diprimary diamines and preferably the polymethylene diamines. Amines which contain oxygen or sulphur atoms in the chain may also be used as typified by bis (3-aminopropyl) ether, bis (2-aminoethoxy) ethane, and bis (3-aminopropyl) thioether. Usually, however, a diamine of the formula NH$_2$—R—NH$_2$ is employed wherein R embodies a saturated divalent hydrocarbon radical with a chain length of at least 2 carbon atoms. In the preferred polymethylene diamines, R is the radical (CH$_2$)$_x$ where $x$ is at least 2. Typical polymethylene diamines include ethylenediamine, trimethylenediamine, tetramethylenediamine, pentamethylenediamine, hexamethylenediamine, heptamethylenediamine, octamethylenediamine, nonamethylenediamine, and decamethylenediamine. In some cases, aromatic diamines such as m-phenylene diamine and benzidine may be used as well as the hydroxy aromatic diamines. In most cases, as illustrated in the examples, it is desirable to actually employ the diamine in the form of a salt with the dibenzoic acid derivative. Thus, in the description and the claims, it is intended that the polyamide formation includes polymerization with the reactants used either separately or in the form of a salt.

The polymers embodying this invention are prepared by heating the acid and diamine as defined at reaction temperature, preferably until the resulting polymer has attained a sufficiently high molecular weight to form filaments when a rod is withdrawn from the melt. In most cases, the progress of the action is followed by means of the inherent viscosity of the polymer, and it is usually desirable to continue the heating until the inherent viscosity has reached a value of at least 0.4 and desirably at least 0.6 as determined in a solution of 60 parts phenol and 40 parts tetrachlorethane in the usual manner. The polymerization reaction can be effected at atmospheric pressure, or partially at atmopheric pressure and partially at an elevated pressure. When a solvent is employed, the reaction can ordinarily be effected at atmospheric pressure under reflux. In some cases, however, it may be desirable, particularly in the early stages of the polymerization, to effect the reaction in a closed reaction vessel under nitrogen. In general, the products embodying this invention are soluble in solvents such as acetic acid, formic acid, butyrolactone, dimethyl formamide, and dimethyl acetamide. In some cases they are also soluble in mixtures of ethylenedichloride with methyl or ethyl alcohol. In general, the polymers melt in the range of about 140–200° C. and it is, therefore, desirable to effect the reaction at a temperature above the melting point of the polymer. Since the polymers melt over a relatively broad temperature range, as for example a range of 10–20°, they are particularly suitable for being extruded in films which can be stretched and heat treated without losing transparency and can be used for making molded products such as lenses or the like which are clear and transparent and have a high impact strength. Because of their molecular structure, the polyamides embodying this invention tend to remain amorphous or to form very small crystallites when extruded, rolled, or drafted. In general, the crystalline areas are so small that they do not diffract light even after processing.

The invention is illustrated by the following detailed examples of certain preferred embodiments thereof.

*Example 1*

A mixture of 284 g. (1 mole) of 4,4'-(1,2-propylene) dibenzoic acid and 116 g. (1 mole) of hexamethylenediamine was dissolved in a mixture of 800 cc. of water and 400 cc. of ethyl alcohol. Additional alcohol was then added to cause the acid-diamine salt to crystallize from solution. The salt was filtered and then recrystallized from a mixture of alcohol and water. A 50 g. batch of this salt was placed in a stainless steel autoclave, the air was flushed out with nitrogen and the autoclave was closed. The salt was then heated at 240° C. for 3 hours. The pressure was then released and the contents were heated at 240–250° C. at atmopsheric pressure for 30 minutes followed by 30 minutes at a pressure of 2 mm. The product had an inherent viscosity of 0.72 in a 60:40 mixture of phenol and tetrachlorethane. The product softened at 150–160° C. and the fibers could be pulled from the melt and drafted to several times their original length.

This polymer was employed for making extruded films in the usual manner and these films retained their clarity after they had been stretched and heat treated. Molded objects made from the polymer were clear and transparent and had a high impact strength. As can be seen from this example, the reaction need not be effected in solvent medium but is readily carried out by merely heating the salt to a temperature at which it remains during the course of the polymerization.

*Example 2*

A polymer was prepared in the manner described in the preceding example from tetramethylenediamine and 4,4'-(1,2-propylene) dibenzoic acid. This polymer softened at 165–180° C. and was particularly valuable as a molding plastic. It was also extruded in the form of rods, tubes, and sheets which retained their transparency during processing.

*Example 3*

A salt was prepared by mixing equivalent amounts of hexamethylenediamine and 4,4'-ethylidene-dibenzoic acid in aqueous alcohol and recrystallizing the salt by the addition of excess alcohol. One part by weight of this salt and one part by weight of xylenol were mixed together and the mixture heated at reflux for 5 hours. The xylenol was then removed under vacuum at 220–230° C. The polymer thereby obtained had an inherent viscosity of 0.82 in a 60:40 solution of phenol and tetrachlorethane and had a softening temperature of 160–175° C. The polymer was particularly suitable for use in molding clear transparent objects of a high impact strength.

*Example 4*

A polymer was prepared from decamethylenediamine and 4,4'-ethylidene-dibenzoic acid in the manner described in the preceding example. The polymeric product softened at 140–150° C. and was useful as a molding plastic and in the manufacture of clear films.

*Example 5*

A salt of hexamethylenediamine and 4,4'-(2,2-propylene)-dibenzoic acid was prepared and recrystallized from aqueous alcohol. A 15 g. portion of the salt was sealed in a glass tube under nitrogen. The tube was heated at 240–250° C. and atmospheric pressure for 30 minutes followed by one hour in a vacuum of 3 mm. The polyamide thus obtained softened at 170–180° C. and was suitable for use as a molding plastic and for the production of fibers in the usual manner, as for example, by melt spinning into fibers which can be cold drawn to give strong elastic fibers.

*Example 6*

A polyamide was prepared from tetramethylenediamine and 4,4'-(1,2-propylenedioxy)-dibenzoic acid according to the method described in Example 1. The polymer thus obtained softened at 130–140° C. and was useful for the preparation of molded and extruded objects.

*Example 7*

A salt was prepared from pentamethylenediamine and the acid of the formula

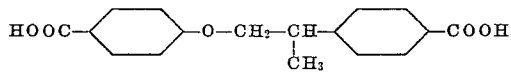

by recrystallization from aqueous alcohol in the usual manner. Polymerization was effected as described in Example 1 and the polyamide thus obtained was a clear plastic useful in preparing molded objects.

Similar linear polyamides having a high degree of transparency can be prepared in like manner from any of the other diamines and 4,4'-substituted dibenzoic acids as defined herein. The resulting polymers can be used for solvent casting and melt castings of clear films, spinning of fibers, extrusion of rods, sheets and tubes, and molding of transparent articles. The polymerization can be readily effected employing equipment commonly used in such polymerization reactions and well known processes. Thus, the preparation of the polymers embodying this invention does not require extensive changes in the commercial equipment presently employed. The diamine and the dibenzoic acid are usually employed in equivalent molar proportions although the proportions can be varied in accordance with known practices.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. The method which comprises heating at reaction temperature a diamine containing at least one hydrogen atom on each amino nitrogen atom and a 4,4'-alkylenedibenzoic acid wherein the alkylene radical has a branched chain and contains from 3 to 6 carbon atoms.

2. The method which comprises heating at reaction temperature a diamine containing at least one hydrogen atom on each amino nitrogen atom with 4,4'-(1,2-propylene)-dibenzoic acid.

3. A polyamide of a diamine containing at least one hydrogen atom on each amino nitrogen atom and a 4,4'-alkylenedibenzoic acid wherein the alkylene radical has a branched chain and contains from 3 to 6 carbon atoms.

4. A polyamide of a polymethylene diamine and 4,4'-(1,2-propylene)- dibenzoic acid.

5. A polyamide of hexamethylene diamine and a 4,4'-alkylene-dibenzoic acid wherein the alkylene radical has a branched chain and contains from 3 to 6 carbon atoms.

6. The method which comprises heating at 210°–280° C. a polymethylene diamine and a 4,4'-alkylene-dibenzoic acid wherein the alkylene radical has a branched chain and contains from 3 to 6 carbon atoms for a time sufficient to form a polyamide having an inherent viscosity of at least 0.4 in a 60:40 solution of phenol and tetrachlorethane.

References Cited in the file of this patent

UNITED STATES PATENTS

| | | |
|---|---|---|
| 2,191,556 | Carothers | Feb. 27, 1940 |
| 2,327,116 | Loder | Aug. 17, 1943 |

OTHER REFERENCES

Webster's New International Dictionary, 2nd edition, page 67.